US012771614B2

(12) United States Patent
Francis

(10) Patent No.: US 12,771,614 B2
(45) Date of Patent: Oct. 20, 2026

(54) EFFICIENT TRANSFER OF COLLECTED DISCOVERY DATA

(71) Applicant: ServiceNow, Inc., Santa Clara, CA (US)

(72) Inventor: Steven W. Francis, San Diego, CA (US)

( * ) Notice: Subject to any disclaimer, the term of this patent is extended or adjusted under 35 U.S.C. 154(b) by 2 days.

(21) Appl. No.: 18/830,378

(22) Filed: Sep. 10, 2024

(65) Prior Publication Data

US 2024/0430169 A1 Dec. 26, 2024

Related U.S. Application Data

(63) Continuation of application No. 18/095,737, filed on Jan. 11, 2023, now Pat. No. 12,113,677.

(51) Int. Cl.
*H04L 41/12* (2022.01)
*H04L 41/085* (2022.01)

(52) U.S. Cl.
CPC ............ *H04L 41/12* (2013.01); *H04L 41/085* (2013.01)

(58) Field of Classification Search
CPC .............................. H04L 41/12; H04L 41/085
See application file for complete search history.

(56) References Cited

U.S. PATENT DOCUMENTS

| | | | | |
|---|---|---|---|---|
| 11,095,506 | B1 | 8/2021 | Erblat | |
| 11,799,826 | B1 * | 10/2023 | Lough | H04L 61/5061 |
| 2013/0185411 | A1 | 7/2013 | Martin | |
| 2016/0094401 | A1 | 3/2016 | Anwar | |
| 2018/0278511 | A1 | 9/2018 | Bruno | |
| 2021/0097092 | A1 * | 4/2021 | Cajias | G06F 16/29 |
| 2022/0311740 | A1 | 9/2022 | Gautam | |

* cited by examiner

*Primary Examiner* — Tonia L Dollinger
*Assistant Examiner* — Joseph M Cousins
(74) *Attorney, Agent, or Firm* — McDonnell Boehnen Hulbert & Berghoff LLP

(57) ABSTRACT

An identifier associated with a plurality of different collection groups of computer system attributes is obtained. The computer system attributes are associated with the plurality of different collection groups based at least in part on recency of changes to the computer system attributes. A discovery scan of the plurality of different collection groups is performed at a scan instance. A first digest value associated with a specific collection group included in the plurality of different collection groups is obtained. A second digest value associated with the specific collection group based on the discovery scan is determined. It is determined that the first digest value is different from the second digest value. An indication associated with the first and second digest values being different is provided.

20 Claims, 9 Drawing Sheets

EFFICIENT TRANSFER OF COLLECTED DISCOVERY DATA

CROSS REFERENCE TO OTHER APPLICATIONS

This application is a continuation of U.S. patent application Ser. No. 18/095,737 entitled EFFICIENT TRANSFER OF COLLECTED DISCOVERY DATA filed Jan. 11, 2023 which is incorporated herein by reference for all purposes.

BACKGROUND OF THE INVENTION

Network topologies often include a server placed within a private network. The internal server can be configured with network access to an outside public network, such as the Internet, as well as with network access to the local network or intranet. The internal server can utilize access to the outside public network to connect to external resources. These external resources can include publicly hosted resources. For example, publicly hosted resources accessible from an internal server can include secure cloud-based application services, such as discovery services, configuration management database (CMDB) services, and/or third-party software-as-a-service applications. Access to the local network or intranet allows the internal server to access local resources including local network devices and their resources that are not accessible from outside the local network.

BRIEF DESCRIPTION OF THE DRAWINGS

Various embodiments of the invention are disclosed in the following detailed description and the accompanying drawings.

DETAILED DESCRIPTION

Figure 1:
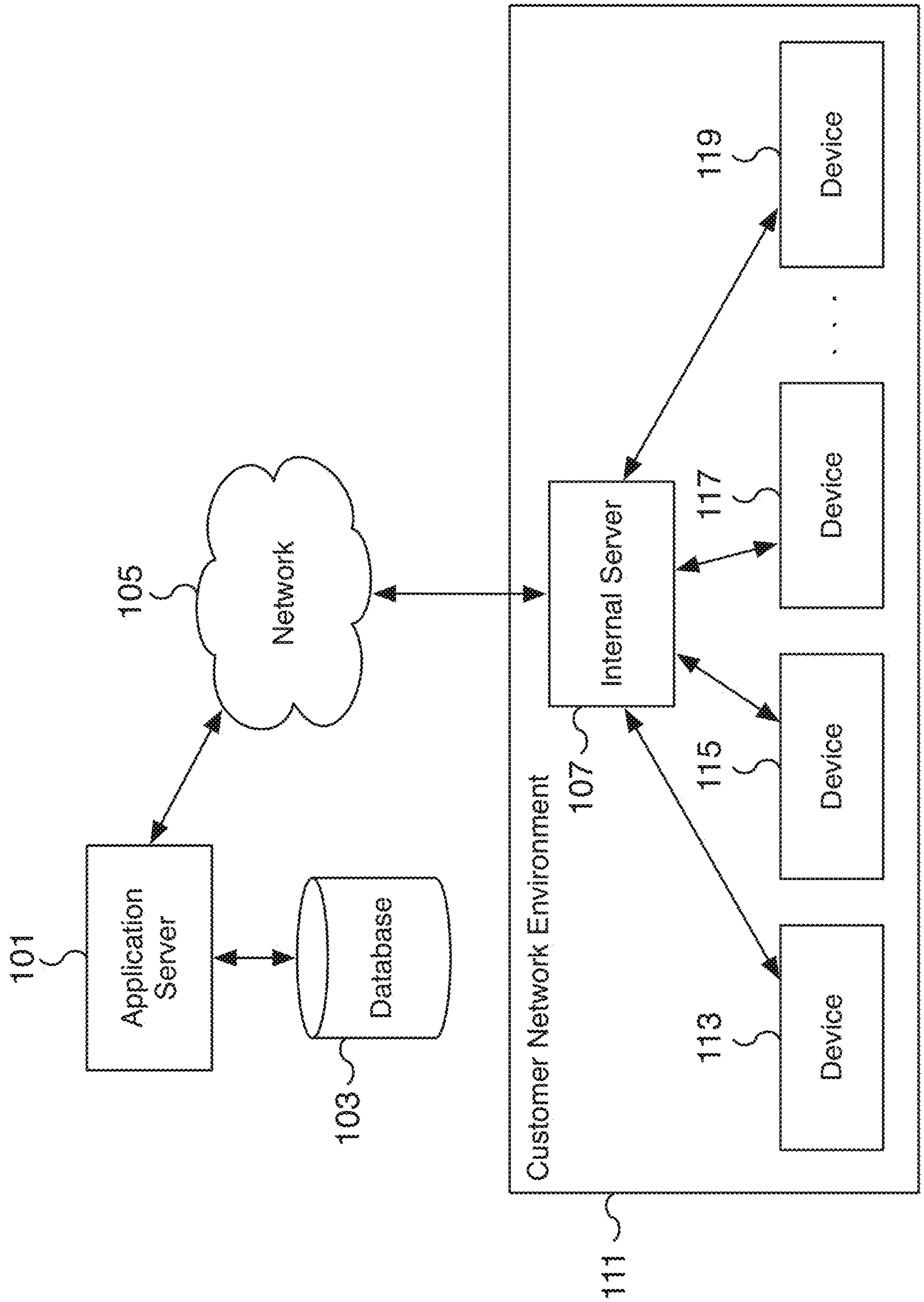
FIG. 1 is a block diagram illustrating an example of a network environment for performing a discovery scan.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term ‘processor’ refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The efficient transfer of collected discovery data is disclosed. Using the disclosed techniques, a discovery scan of devices or entities associated with a network environment is performed with significantly improved data transfer characteristics. A cloud-based discovery scan is first configured and scheduled via a discovery application service to collect values for different attributes of devices or entities installed within a network environment, such as a customer network. The devices or entities can include networking equipment such as firewalls, routers, and gateways, as well as servers, applications, virtual machines, containers, or other entities. In some embodiments, these managed items are stored in a configuration management database (CMDB) and managed using a CMDB service. As part of the discovery scan configuration, the attributes to be collected are grouped into collection groups. The grouping can be performed based on when and/or how often the values for the attributes in a collection group change. In some embodiments, the configuration process includes configuring one or more discovery probes to be executed for each discovery scan.

In various embodiments, an internal server located within the desired network infrastructure is utilized in performing the discovery scan. For example, the discovery service provides the configured discovery probes to an internal server to collect the desired attribute values along with digest values associated with the last known state of each collection group. Using the discovery probes, the current values are collected by the internal server for the attributes of each collection group and a new digest value is determined for each collection group based on the newly collected values. For collection groups where the last known and new digest values differ, the newly collected attribute values for the collection group are included in the discovery scan results along with the new digest value. For collection groups where the last known and new digest values are the same, the newly collected attribute values for the collection group are excluded from the discovery scan results. In various embodiments, an indication whether the values of the attributes within a collection group have changed can be included for each collection group. Once the discovery scan results are received by the discovery application service, the included attribute values can be updated. In particular embodiments, the values are checked again before performing an update, for example, in the event a separate discovery scan has already updated the values. In various embodiments, only attribute values included in the discovery scan results are updated by the discovery scan service. By identifying entire collection groups of attributes that have not changed and excluding the corresponding attribute values from the scan results, the data transfer required for each discovery scan is significantly reduced. Since discovery scans are often performed frequently, can include hundreds or more devices, and can collect values for hundreds or more attributes, the total reduction in data is consequential and the results can yield substantial performance benefits.

In some embodiments, a collection group of computer system attributes is identified. For example, as part of a discovery scan configured via a cloud-based discovery service, attributes associated with a device or entity, such as attributes associated with a computer system, are grouped together and identified as a collection group. A first digest value associated with the collection group is obtained. For example, a digest value is calculated for the collection group. The digest value can be determined by the discovery service based on the last (or previously) discovered values for each of the attributes within the collection group. In some embodiments, the digest value is determined using a digest or hash function. In some embodiments, a second digest value associated with the collection group is determined by performing a discovery scan of the collection group, wherein the second digest value is based on discovered values of the computer system attributes. For example, a discovery probe is performed to collect current values for each of the attributes of the collection group by probing the desired computer system. In various embodiments, the discovery probe is performed by an internal server located within and on the same network environment as the computer system. The second digest value can be performed by applying a digest or hash function on the collected attribute values.

In various embodiments, a determination is made that the first digest value is different from the second digest value. For example, the first and second digest values are compared to determine whether they match or are different. In the event a determination is made that the digest values are different, an indication that one or more attribute values of the collection group has changed from a previously collected data of the collection group is prepared. For example, the prepared indication indicates that at least one of the collected attribute values differs from the last discovered values. The indication and at least a subset of the discovered values of the computer system attributes are provided, for example, to the discovery service. Once received at the discovery service, the indication is processed and the provided discovered computer system attribute values can be updated at a storage associated with the discovery service. In some embodiments, the discovered values are stored in a database such as a discovery service and/or configuration management database (CMDB).

In the event a determination is made that the first and second digest values match, a determination is made that the attribute values within the collection group have not changed since the previously collected data of the collection group. The discovered attribute values can be excluded from the discovery scan results and do not need to be provided, for example, to the discovery service, since no updates for the collection group are required. In some embodiments, an indication that the one or more attribute values of the collection group have not changed from the previously collected data of the collection group is prepared and the corresponding indication is provided, for example, to the discovery service, instead of providing the entire set of attribute values.

FIG. 1 is a block diagram illustrating an example of a network environment for performing a discovery scan. In the example shown, application server 101 and customer network environment 111 are connected via network 105. Network 105 can be a public or private network. In some embodiments, network 105 is a public network such as the Internet. In various embodiments, application server 101 is a cloud-based application server that provides application services and utilizes database 103, which is communicatively connected to application server 101. Application server 101 together with internal server 107, which is located within customer network environment 111, are part of a discovery platform for discovering attribute values related to devices within customer network environment 111. For example, using a discovery service offered by application server 101, an administrator can schedule discovery scans to collect attribute values associated with the different devices of customer network environment 111. The devices can be managed as part of a cloud service such as a configuration management database (CMDB) service of application server 101. In the example shown, example devices of customer network environment 111 include devices 113, 115, 117, and 119.

In some embodiments, application server 101 provides cloud-based services for managing information technology operations including discovery services and configuration management database (CMDB) services. For example, entities (or devices) within a customer's network infrastructure, such as devices 113, 115, 117, and 119, can be discovered, tracked, and managed using discovery and CMDB services. In various embodiments, application server 101 relies on internal server 107 to complete the discovery process, including probing devices within customer network environment 111 for device specific attribute values. For example, a discovery scan is scheduled via a discovery service of application server 101. The scheduled scan includes one or more configured probes that specify the attributes to collect. Example attributes can include a manufacturer, an operating system type, an operating system version, an uptime value, a processor speed, a memory description, and installed applications, among other attributes of the target entity. Once the discovery scan is initiated, the probes are provided to internal server 107, which manages the collection of the attribute values for the targeted devices and/or entities. The collected attribute values are aggregated at internal server 107 and, using at least in part the disclosed techniques herein, only the relevant values are passed back to application server 101. Application server 101 stores the collected attribute values in database 103.

In some embodiments, customer network environment 111 is an information technology network environment and includes multiple hardware devices including devices 113, 115, 117, and 119, as examples. Devices 113, 115, 117, and 119 correspond to hardware devices and each can be one of a variety of different hardware device types including networking equipment (such as gateways and firewalls), servers, and other computing devices including employee laptops and desktops. Devices 113, 115, 117, and 119 are each configured with different hardware and software components and their properties can be expressed as attributes. Example attributes include processor type, processor count, memory size, memory type, operating system type, and operating system version, among others. In various embodiments, customer network environment 111 is connected to network 105. In the example shown, internal server 107 is capable of initiating network connections to each of devices 113, 115, 117, and 119 and retrieving attribute values associated with each of the respective devices.

In the example shown, internal server 107 is an intranet server of customer network environment 111. Internal server 107 can be configured to receive and perform discovery scan requests from application server 101. The results of the discovery scan are sent back to application server 101 where they can be stored in database 103. In various embodiments, a discovery scan includes one or more probe requests, which specify the attributes to collect from one or more devices. In various embodiments, the specified attributes are grouped into collection groups. In the event none of the values for the attributes in a collection group have changed, the attribute values are not updated. However, in the event one or more of the values for the attributes in a collection group have changed since the last discovery scan, the attribute values of the entire group are uploaded to application server 101 to update database 103. In various embodiments, a first digest is calculated for the collection group based on the values from the previous discovery scan and a second digest is calculated for the collection group based on the values from the current discovery scan. In the event the two digest values differ, the collection group is determined to have attribute values that have changed, and the attribute values of the entire group are uploaded to application server 101 to update database 103. In some embodiments, the digest is calculated as a hash value using a one-way function. In some embodiments, the digest corresponding to the previous discovery scan is performed by the discovery service at application server 101 and the digest corresponding to the current discovery scan is performed by internal server 107. In various embodiments, internal server 107 is utilized to perform the discovery scan because it resides within customer network environment 111 and has increased access privileges that devices outside of customer network environment 111 do not have. For example, the probe requests on devices within customer network environment 111 cannot be performed directed by a device located outside of customer network environment 111.

In some embodiments, database 103 is utilized by application server 101 for providing application services including discovery and CMDB services. For example, database 103 can be a configuration management database (CMDB) used at least in part for managing assets that are under the management of an organization, such as devices 113, 115, 117, and/or 119 of customer network environment 111. Each managed asset can be represented as a configuration item. In some embodiments, database 103 stores information related to managed assets, such as the hardware and/or software configuration of a computing device, as configuration items. In some embodiments, database 103 is implemented using one or more databases such as one or more distributed database servers. For example, although shown as a single entity in FIG. 1, database 103 can be implemented as one or more distributed database components connected via network 105 to application server 101.

Although single instances of some components have been shown to simplify the diagram of FIG. 1, additional instances of any of the components shown in FIG. 1 may exist. For example, application server 101 and database 103 may include one or more servers and/or may share servers. In some embodiments, database 103 may not be directly connected to application server 101. For example, database 103 and its components may be replicated and/or distributed across multiple servers and/or components. In some embodiments, components not shown in FIG. 1 may also exist. For example, network clients used to access application server 101 are not shown.

Figure 2:
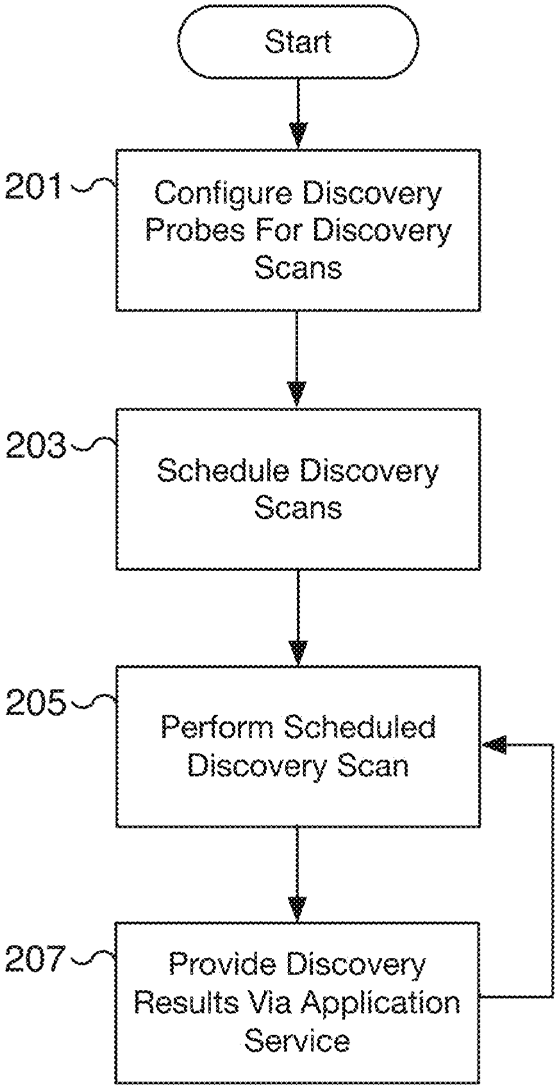
FIG. 2 is a flow chart illustrating an embodiment of a process for performing a discovery scan within a customer network.

FIG. 2 is a flow chart illustrating an embodiment of a process for performing a discovery scan within a customer network. Using the process of FIG. 2, a discovery process of devices located within a customer network infrastructure can be configured and managed using a discovery service. The discovery process is configured using a discovery service and when a discovery scan is performed, probe requests are initiated from an internal server located within the customer's network infrastructure. The internal server collects the requested attribute values for the requested customer devices and the discovery data is provided to the discovery service where it is stored in an application service database. The customer can then access the discovery scan results via the discovery service, a CMDB service, or another application service. To improve the efficiency of the discovery process, attribute values that have not changed since the last discovery scan can be identified and their respective values are excluded from the discovery scan updates. In some embodiments, the process of FIG. 2 is performed by a discovery service running on an application server such as application server 101 of FIG. 1, the customer's information technology environment is customer network environment 111 of FIG. 1, and the internal service is internal server 107 of FIG. 1. In some embodiments, the discovery scan results are stored in a database such as database 103 of FIG. 1.

At 201, discovery probes are configured for discovery scans. For example, using a discovery service, one or more discovery scans are configured by configuring one or more discovery probes. Each discovery probe can define a list of entities, for example, by a device identifier, for which attribute values should be discovered. In some embodiments, the device identifier can include a serial number, a custom configuration of attributes and values, a MAC address, an IP address, and/or another unique identifier. In various embodiments, a discovery probe further describes the attribute values to collect for each entity. For example, a discovery probe for a Linux server may include collecting values for attributes corresponding to operating system type, operating system version, operating system uptime, memory configuration, processor configuration, networking configuration, and storage configuration. As another example, a discovery probe for a firewall device may include collecting values for attributes corresponding to the operating system type, operating system version, operating system uptime, firewall configuration, network performance, and network statistics, among other attributes.

In some embodiments, the attributes to be discovered are grouped into collection groups. For example, attributes whose values change with similar frequency can be grouped together. As one example, attributes that rarely change are grouped together, attributes that change daily are grouped together, attributes that change weekly are grouped together, and attributes that change monthly are grouped together. In some embodiments, the granularity of frequency used to group attributes can differ and, in some embodiments, the attributes are automatically grouped, for example, based on their identified change characteristics. In various embodiments, attributes that are grouped together into a collection group can be discovered together.

At 203, discovery scans are scheduled. For example, one or more discovery scans are scheduled. In some embodiments, the discovery scans are scheduled to be performed at fixed times and/or following a particular frequency, such as twice daily, daily, every other day, once a week, or following another schedule.

At 205, a scheduled discovery scan is performed. For example, using the schedule set at 203, discovery scans are performed. In various embodiments, a discovery scan is performed by providing the configured probe requests to an internal server located within the customer's network environment. After receiving a discovery probe, the internal server can collect values for the device attributes requested by the configured discovery probe. Once the attribute values are collected, the internal server can determine which values to provide for updating at the application server. In some embodiments, the attribute values are collected and updated as a group of attribute values. In various embodiments, the internal server can cache the discovery probes for further discovery scans (or discovery scan updates).

At 207, discovery scan results are provided via an application service. Using the discovery scan data provided by the scheduled discovery scan performed at 205, the discovery scan results can be provided to a customer via an application service. For example, an administer for the customer can access a list of assets and their attributes via the application service. In some embodiments, the list of assets is used for additional business workflows such as tracking information technology incidents. In various embodiments, the discovery scan results are used to provide a CMDB service.

As shown at step 207, processing loops back to step 205. For example, once the discovery scans are configured at 201 and scheduled at 203, processing can continue as scheduled scans are performed at 205 and the (updated) results are provided at 207. In this manner, the discovery data for interested customer devices is kept up to date and the customer can access the latest results via one or more application services.

Figure 3:
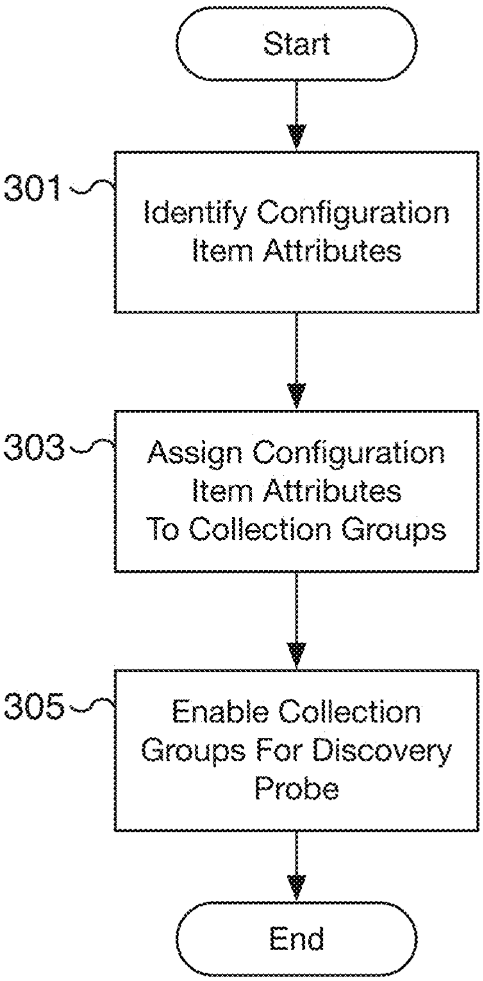
FIG. 3 is a flow chart illustrating an embodiment of a process for configuring a discovery probe for a discovery scan.

FIG. 3 is a flow chart illustrating an embodiment of a process for configuring a discovery probe for a discovery scan. Using the process of FIG. 3, a discovery probe is created that groups similar attributes together into a collection group. By grouping attributes into collection groups, only the collection groups that include attributes whose values have changed since the last discovery scan are updated. Collection groups without any updated attribute values do not need to be updated, improving the efficiency of the discovery scan. In some embodiments, the process of FIG. 3 is performed by a discovery service running on an application server such as application server 101 of FIG. 1 at 201 of FIG. 2.

At 301, configuration item attributes are identified. In some embodiments, each device (or entity) that is managed by an application service is represented as a configuration item, and each configuration item can be represented as one or more records in a configuration management database (CMDB). At 301, the attributes that should be monitored for each configuration item are identified. Examples of configuration item attributes include operating system type, operating system version, operating system uptime, memory configuration, memory performance, processor configuration, processor performance, networking configuration, networking performance, storage configuration, and storage performance, among others. In some embodiments, executable code and/or scripts required for execution or processing to collect the associated values for the desired attributes are provided as part of identifying the configuration items. In some embodiments, new configuration item attributes can also be defined and identified.

At 303, configuration item attributes are assigned to collection groups. For example, each configuration item attribute is assigned to one or more collection groups. The assignment can be based on the frequency that the attribute value changes. For example, all attributes that change daily can be assigned to a single collection group. Similarly, attributes that change hourly can be assigned to a different collection group. In some embodiments, the assignment is automated and based on the properties of the attribute and can include analyzing the historical behavior of the attribute. For example, attributes that have similar change frequency and/or that change at or near the same time can be automatically grouped together.

At 305, collection groups are enabled for a discovery probe. For example, once attributes are identified and assigned to a collection group, collection groups are enabled for a discovery probe. By enabling a collection group for a discovery probe, the attributes assigned to the collection group are collected at the next discovery scan using the associated discovery probe. In various embodiments, in the event any values for attributes within a collection group are found to have changed during a discovery scan, all values for all attributes within the collection group are collected and provided back to the application server, for example, to update a configuration management database (CMDB). In some embodiments, the last collected values associated with the attributes of the collection group prior to the discovery scan are used to determine a digest value. This digest value is used to determine whether the attribute values within a collection group have changed since the last discovery scan.

Figure 4:
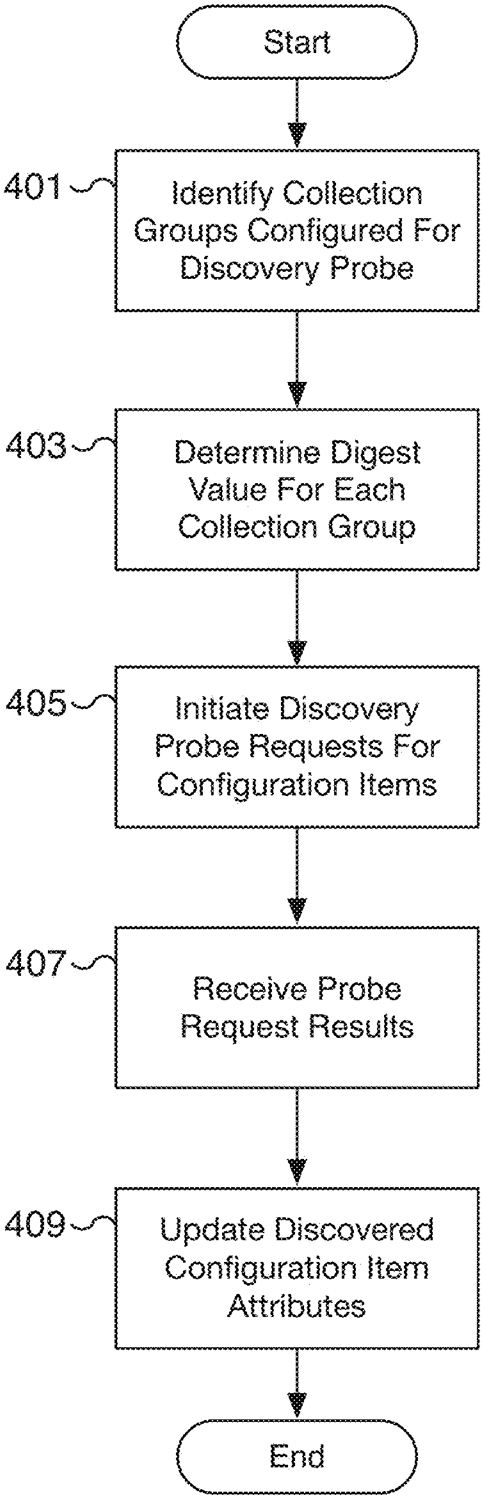
FIG. 4 is a flow chart illustrating an embodiment of a process for performing a discovery scan using a discovery probe configured with collection groups.

FIG. 4 is a flow chart illustrating an embodiment of a process for performing a discovery scan using a discovery probe configured with collection groups. Using the process of FIG. 4, collection groups associated with a discovery probe are processed and corresponding digest values are provided to an internal server to assist in the efficient collection of attribute values associated with a managed device or entity. In some embodiments, the process of FIG. 4 is performed by a discovery service running on an application server such as application server 101 of FIG. 1 at 205 of FIG. 2 with the help of an internal server such as internal server 107 of FIG. 1 to collect attributes associated with a device within a customer network such as customer network environment 111 of FIG. 1.

At 401, collection groups configured for a discovery probe are identified. For example, a discovery probe can be configured with one or more collection groups. The different collection groups can be configured based on how frequent the associated attributes within the group change. For example, a first collection group can include attributes that typically change hourly, a second collection group can include attributes that typically change daily, a third collection group can include attributes that typically change weekly, and a fourth collection group can include attributes that rarely change. At 401, each of the collection groups for a discovery probe are identified in preparation for collecting updated attribute values in the event any of the attributes associated with the discovery probe have changed.

At 403, a digest value is determined for each collection group. Using the collection groups identified at 401, an updated digest value is determined for each collection group. In various embodiments, the updated digest value is determined based on a hash of the values for the attributes within the collection group. For example, for a collection group that contains five attributes, the digest is determined based on the last values collected for the five attributes. In this manner, the digest determined for a collection group is a function of the last values collected for the collection group. In some embodiments, the digest value is a hash value based on each attribute value of the collection group. In some embodiments, the digest value is calculated using a digest or hash function.

At 405, discovery probe requests are initiated for configuration items. In various embodiments, a typical discovery scan will probe multiple configuration items to collect attribute values for each of the associated devices or entities. As part of the discovery scan, one or more discovery probe requests are initiated, and for each discovery probe request, one or more configuration items are probed. In various embodiments, a discovery probe request is initiated by providing the corresponding discovery probes to an internal server located within the customer's network infrastructure. Each discovery probe includes the configuration items to probe as well as the attributes for which to collect values. In some embodiments, a provided discovery probe can further include scripts and/or executables that perform the actual probing to collect the requested attribute values. In various embodiments, the discovery probe or at least a portion of the discovery probe can be cached at the internal server. For example, in some embodiments, scripts and executables for performing a discovery probe for specific attribute values can be cached at the internal server along with the attributes that make up a collection group.

In various embodiments, as part of a discovery probe request, for each collection group defined in the associated discovery probe, values for the collection group attributes are collected. For example, a collection group that specifies five attributes collects the five corresponding attribute values. In various embodiments, prior to performing a discovery scan for a collection group, the digest value for the collection group is provided along with an identifier of the collection group. The digest value, as determined at 403, corresponds to a digest based on the values collected from a previous (or last) discovery scan. In some embodiments, the digest value is provided as part of the discovery probe request and can be provided separate from the (potentially) cached portions of the discovery probe. For example, in particular embodiments, only digest values along with an identifier of the collection group are provided to the internal server to initiate the discovery probe for a configuration item. Using the provided information, the internal server can determine what attributes to collect for a specified configuration item. Furthermore, using the provided digest value, the internal server can determine whether the attribute values of the collection group have changed since the discovery probe request was initiated.

At 407, discovery probe results are received. For example, in response to the discovery probe request initiated at 405, discovery probe results are received at 407. By utilizing the digest value provided at 405, the received results include only attribute values for the collection groups that include changed attribute values. For example, in the event the attribute values for an entire collection group have not changed, the discovery probe results do not include the attribute values for the unchanged collection group. By excluding unchanged collection groups from the discovery probe results, the data returned by the internal server is significantly reduced. In various embodiments, the discovery probe results can include an indicator of whether the attribute values in a collection group have changed (or not) since the discovery probe request initiated at 405. In various embodiments, in the event any of the attribute values for a collection group have changed, the discovery probe results include attribute values for each of the attribute values. In some embodiments, the discovery probe results further include a digest value for any collection groups with new attribute values. The digest included reflects the values of the attributes as collected by the internal server in response to the discovery probe request. In some embodiments, the discovery probe results include additional metadata such as time values or timestamps associated with the discovery scan and the source of the internal server.

At 409, discovered configuration item attributes are updated. For example, using the received discovery probe results, the attribute values for a configuration item are updated. The updating may include writing the attribute values to a configuration management database (CMDB). In some embodiments, the attribute values are first checked to determine whether they are still the newest values prior to updating CMDB entries. For example, an included time value or timestamp and/or an included digest is checked to determine whether another discovery scan may have already updated the corresponding attribute values.

Figure 5:
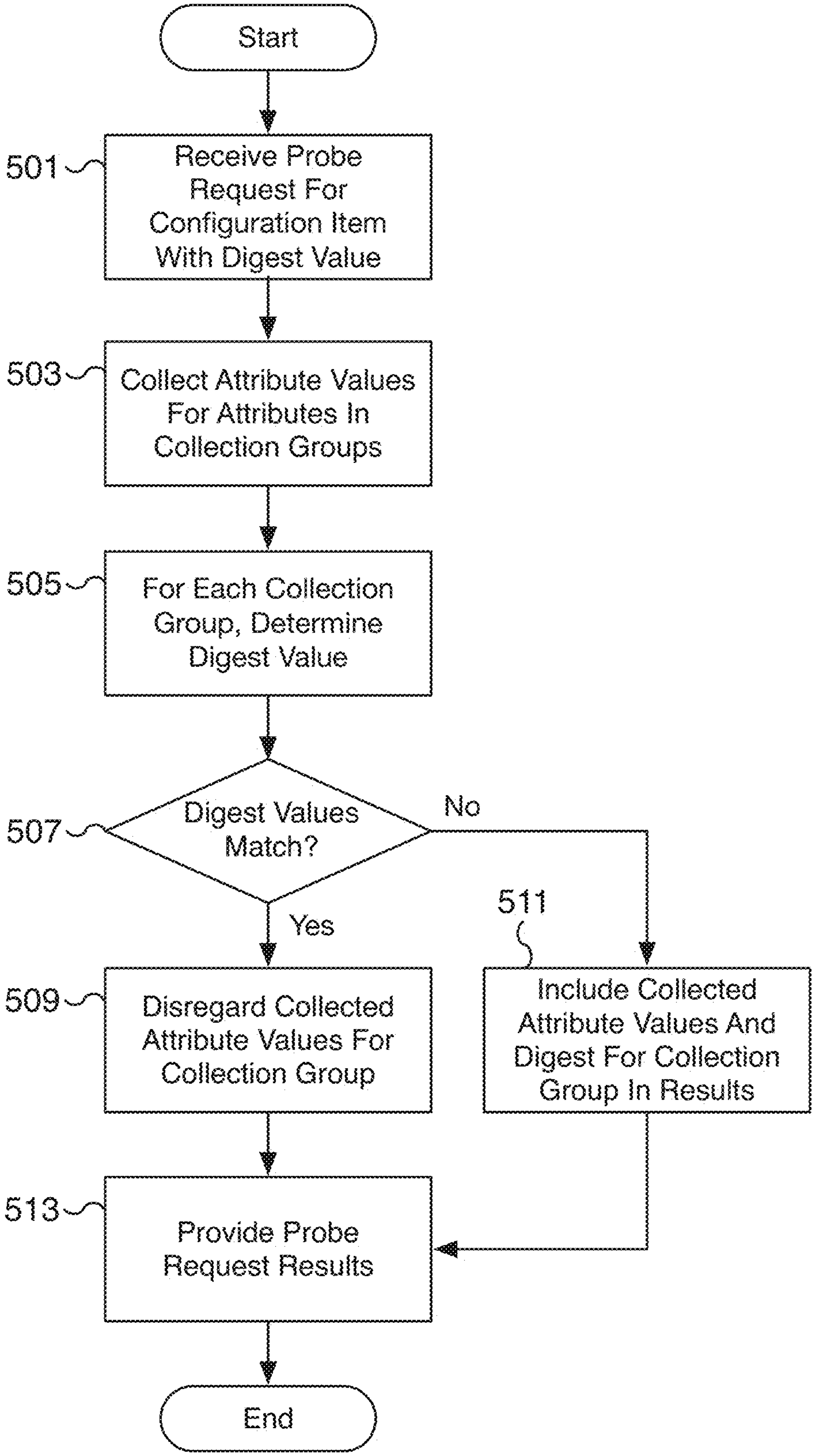
FIG. 5 is a flow chart illustrating an embodiment of a process for performing a discovery probe by an internal server.

FIG. 5 is a flow chart illustrating an embodiment of a process for performing a discovery probe by an internal server. For example, using the process of FIG. 5, an internal server can perform a discovery probe as part of a discovery scan in response to a discovery probe request. In some embodiments, the discovery probe scan and corresponding probe requests are initiated by a discovery service to direct the internal server to collect attributes from devices or entities located on the same network infrastructure as the internal server, such as within the same customer network. In various embodiments, the process of FIG. 5 is performed by an internal server to collect attributes for a particular configuration item but could be repeated for multiple configuration items by applying the process for each configuration item associated with a discovery probe. For example, the process of FIG. 5 is described for a set of collection groups with associated digest values determined for a particular configuration item, such as a particular customer device. In some embodiments, the process of FIG. 5 is performed at 205 of FIG. 2 and/or at 405 and/or 407 of FIG. 4. In some embodiments, the internal server is internal server 107 of FIG. 1, the discovery service is run on application server 101 of FIG. 1, and/or the customer network is customer network environment 111 of FIG. 1.

At 501, a discovery probe request is received for a configuration item. For example, a request to collect attributes for a particular configuration item is received. As part of the discovery probe request, the desired attributes are grouped by collection groups and, for each collection group, an associated digest value is provided that corresponds to a digest of previous collected attribute values from a previous discovery probe request.

At 503, attribute values are collected for attributes in collection groups. For example, for each collection group, the values for the attributes defined by the group are collected. Although not a requirement, in particular embodiments, the collection groups can include overlapping attributes. In various embodiments, the execution and/or scripts required to collect the attributes are provided as part of the discovery probe and/or can be cached from a previous discovery probe.

At 505, a digest value is determined for each collection group. For example, using the attribute values collected at 503, digest values are determined for each collection group. In various embodiments, a determined digest value for a collection group is based on a hash of the values for the attributes for the collection group. For example, for a collection group that contains five attributes, the digest is determined based on the values collected for the five attributes at 503 for the configuration item. In this manner, the digest determined for a collection group is a function of the current attribute values collected for the collection group. In some embodiments, the digest value is a hash value based on each attribute value of the collection group. In some embodiments, the digest value is calculated using a digest or hash function.

At 507, a determination is made whether the digest values match. For example, for each collection group, the digest value included in the discovery probe request received at 501 is compared to the digest value determined at 505. In the event the digest values match, processing proceeds to 509. In the event the digest values do not match, indicating that the attribute values have changed for the collection group since a previous discovery scan, processing proceeds to 511.

At 509, collected attribute values for a collection group are disregarded. Since the digest value included in the discovery probe request received at 501 matches the digest value determined for the collection group at 505 as determined at 507, a determination is made that the attribute values for the collection group have not changed and an update is not required. The attribute values collected at 503 for the corresponding collection group are not included as part of the probe request results to be sent to the application server and are disregarded. In some embodiments, although the attribute values are not included, the digest for the collection group is included in the discovery probe request results. In some embodiments, a time value or timestamp associated with the collection and/or an identifier for the configuration item is also included in the discovery probe request results.

At 511, collected attribute values and the digest for a collection group are included in the results. Since the digest value included in the discovery probe request received at 501 did not match the digest value determined for the collection group at 505 as determined at 507, a determination is made that one or more of the attribute values for the collection group have changed and the updated values should be included in the discovery probe request results. The attribute values collected at 503 for the corresponding collection group are included as part of the probe request results to be sent to the application server. Along with the included attribute values, the digest determined at 505 for the collection group is also included. In some embodiments, a time value or timestamp associated with the collection and/or an identifier for the configuration item is also included in the discovery probe request results.

At 513, probe request results are provided. For example, the attribute values for any collection group that includes attribute values that have changed are provided as part of the probe request results. In some embodiments, digests based on the current collected attributes are included for each collection group and/or an indicator that indicates whether the collection group has changed. In various embodiments, the probe request results are provided to the discovery service running on the application server where they can be processed and stored. For example, the updated attribute values can be stored by the application server in a configuration management database (CMDB). In some embodiments, the probe request results for multiple discovery probes and/or for multiple configuration items are batched together. For example, the probe request results for an entire discovery scan can be batched together and sent as the results of a completed discovery scan of the customer network environment to the application server.

Figure 6:
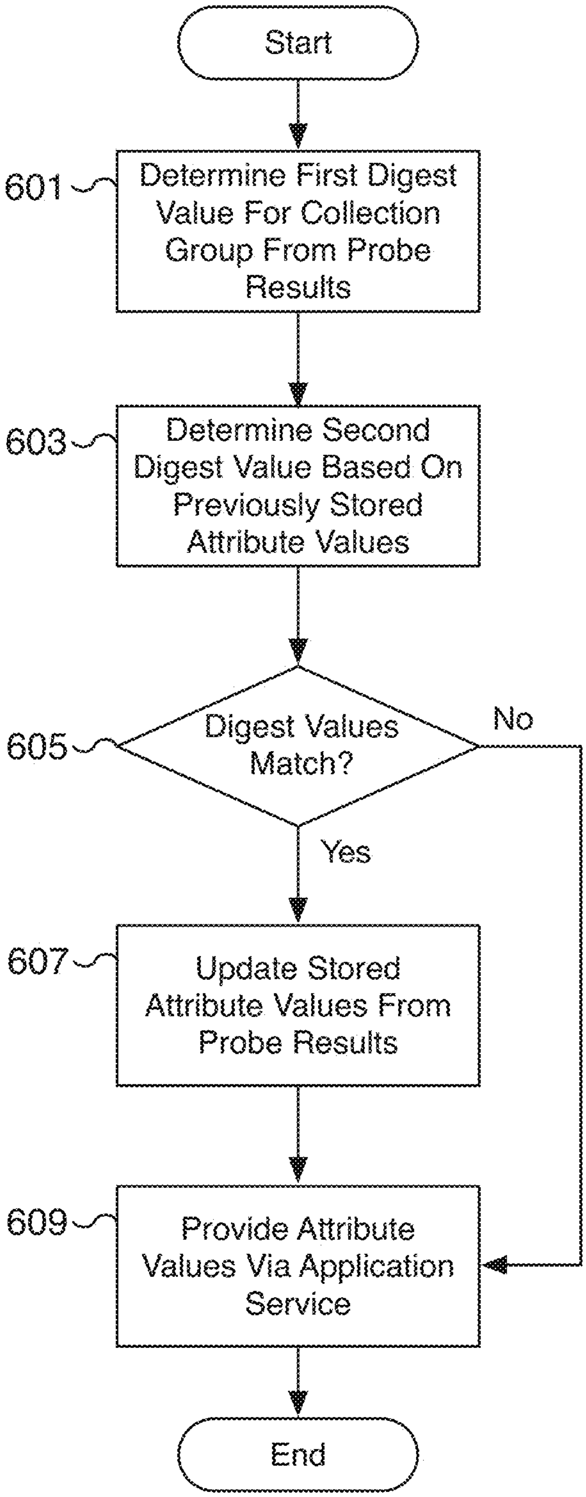
FIG. 6 is a flow chart illustrating an embodiment of a process for providing updated discovery scan results using a discovery probe configured with collection groups.

FIG. 6 is a flow chart illustrating an embodiment of a process for providing updated discovery scan results using a discovery probe configured with collection groups. Using the process of FIG. 6, attribute values of collection groups for configuration items included in discovery probe results performed as part of a discovery scan are processed and used to update a discovery service running on an application server. The updated attribute values can then be accessed via one or more application services, for example, via discovery or configuration management database (CMDB) services. In various embodiments, the process of FIG. 6 is performed by a discovery service for a particular collection group of a configuration item and can be repeated for multiple collection groups of multiple configuration items by applying the process for each configuration item and collection group included in the discovery probe results. In some embodiments, the process of FIG. 6 is performed by a discovery service running on an application server such as application server 101 of FIG. 1 at 205 of FIG. 2 and/or at 407 and/or 409 of FIG. 4. In some embodiments, the step of 609 is performed by one or more application services utilizing the results of the discovery process and can include application services such as application services running on application server 101 of FIG. 1. In some embodiments, the discovery probe results are provided by an internal server such as internal server 107 of FIG. 1 based on attributes collected from a customer network such as customer network environment 111 of FIG. 1. In some embodiments, the updated attribute values are stored in a database such as database 103 of FIG. 1.

At 601, a first digest value for the collection group is determined from the probe results. For example, a digest value included within the probe results for the particular collection group being processed is extracted for the probe results. In various embodiments, the digest value is based on the values of all the attributes within the collection group.

At 603, a second digest value is determined based on previously stored attribute values. For example, the previously stored values for the attributes within the collection group are used to determine a second digest value. The digest value corresponds to the values collected from a previous discovery scan.

At 605, a determination is made whether the digest values match. In the event the first and second digest values match, processing proceeds to 607 where the recently collected attribute values for the attributes within the collection group are updated. In the event the first and second digest values do not match, processing proceeds to 609 and no updates are applied for the values of the attributes within the collection group.

At 607, the stored attribute values are updated using the attribute values from the probe results. For example, for each attribute in the collection group, the values collected and included in the probe results are updated by the application server. In some embodiments, the update includes storing the attribute values in a configuration management database (CMDB). For example, CMDB entries corresponding to the attribute are updated to reflect the newly collected attribute values.

At 609, the attribute values are provided via an application service. For example, the attribute values discovered during discovery scans are provided to authorized users as part of one or more application services. In some embodiments, the values are provided as part of a CMDB service. For example, the attribute values can be used as part of a workflow for managing devices or entities within a customer network. Each managed entity can correspond to a configuration item with an entry in the CMDB database that includes attributes having the attribute values discovered during discovery probes. As the attribute values change, the values within the CMDB database are updated based on discovery scan updates and are provided as requested via one or more application services.

Figure 7:
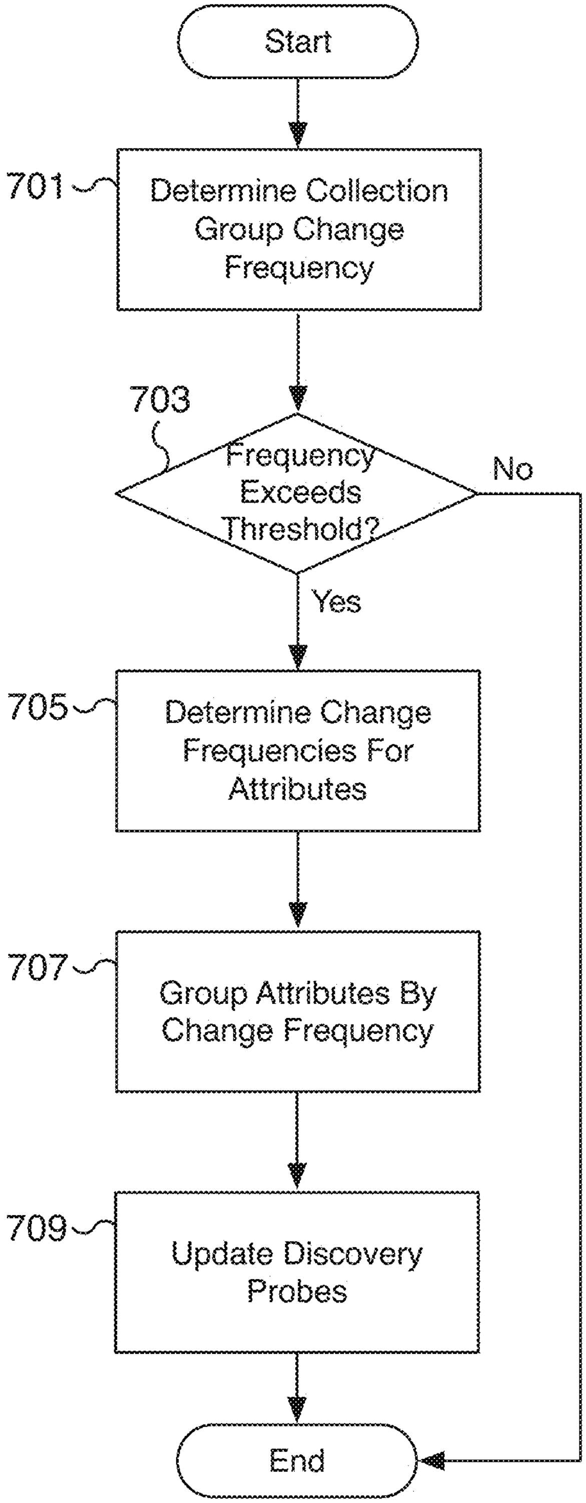
FIG. 7 is a flow chart illustrating an embodiment of a process for automatically grouping attributes into collection groups for a discovery probe.

FIG. 7 is a flow chart illustrating an embodiment of a process for automatically grouping attributes into collection groups for a discovery probe. For example, using the process of FIG. 7, attributes can be automatically assigned to a collection group based on the frequency the values for an attribute change. By grouping similar changing attributes together, many of the attributes within a collection group can be updated together as they change. In some embodiments, the process of FIG. 7 is performed by a discovery service at 205 of FIG. 2 and/or at 303 of FIG. 3. In some embodiments, the discovery service is run by an application server such as application server 101 of FIG. 1 and the attributes correspond to attributes of a device or entity within a customer network such as customer network environment 111 of FIG. 1.

At 701, the change frequencies of collection groups are determined. For example, for each collection group, a determination is made on how often the collection group requires updating and how many of the attributes within the collection group required updating. In various embodiments, a collection group is updated only when one of the values for an attribute within the collection group changes. The change frequency can be determined based on the historical change behavior of the collection group. In some embodiments, the change frequency is weighted more heavily towards recent changes.

At 703, a determination is made whether the change frequency exceeds a configured threshold. In the event the change frequency exceeds a configured threshold, processing processed to 705. In the event the change frequency does not exceed a configured threshold, processing completes.

At 705, the change frequencies for attributes within the collection groups are determined. For example, the historical behavior of the attributes and how frequently the values change are analyzed to determine the change frequency of each attribute. In some embodiments, the change frequency is weighted more heavily towards recent changes.

At 707, the attributes are grouped by change frequency. Using the change frequencies determined at 705, the attributes are grouped by similar change frequency. In some embodiments, a configured number of collection groups is used to bin the attributes into a fixed number of bins. In some embodiments, the number of collection groups is automatically determined based on the difference between attribute change frequencies. For example, attributes that change hourly can be grouped together, attributes that only change daily can be grouped together, attributes that only change weekly can be grouped together, and attributes that change less often than once a week can be grouped together. In some embodiments, the attributes are further grouped by the time of their expected change and/or change pattern. For example, attributes that change during peak times may be grouped together and/or attributes that change during similar seasonal patterns are grouped together.

At 709, the discovery probes are updated. For example, using the new collection groups, one or more discovery probes are updated. In some embodiments, a subset of the discovery probes may no longer include certain collection groups since particular collection groups may require probing at less frequent intervals. In various embodiments, the discovery probes are updated to include the new collection groups.

Figure 8:
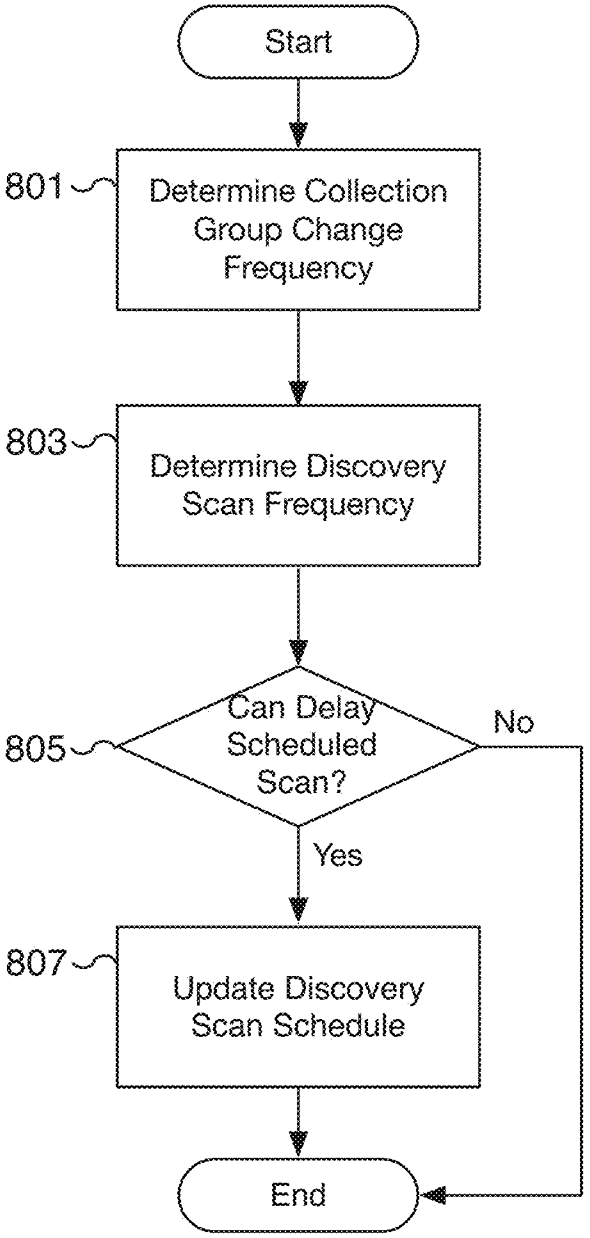
FIG. 8 is a flow chart illustrating an embodiment of a process for automatically scheduling a discovery scan based on collection group change frequency.

FIG. 8 is a flow chart illustrating an embodiment of a process for automatically scheduling a discovery scan based on collection group change frequency. For example, using the process of FIG. 8, discovery scans can be scheduled in anticipation that the attributes to be discovered have recently changed. Similarly, discovery scans can be scheduled to avoid running discovery scans where the attributes have likely not changed. In some embodiments, the process of FIG. 8 is performed by a discovery service at 203 of FIG. 2. In some embodiments, the discovery service is run by an application server such as application server 101 of FIG. 1 and the discovered attributes correspond to attributes of devices or entities within a customer network such as customer network environment 111 of FIG. 1

At 801, the change frequency of a collection group is determined. For example, for each collection group configured for a discovery scan, a determination is made on how often the collection group requires updating. In various embodiments, a collection group is updated only when one of the values for an attribute within the collection group changes. The change frequency can be determined based on the historical change behavior of the collection group. In some embodiments, the change frequency is weighted more heavily towards recent changes.

At 803, the discovery scan frequency is determined. In some embodiments, the scan frequency is configured by an administrator. For example, the requested discovery scan frequency can be configured by an administrator to perform a discovery scan hourly, daily, twice-daily, weekly, and/or using another interval.

At 805, a determination is made whether the scheduled scan can be delayed. In the event the scheduled scan can be delayed, processing continues to 807 where the discovery scan schedule is updated. In the event the scheduled scan cannot be delayed, processing completes and the scheduled scan performs as previously scheduled without delay.

At 807, the discovery scan schedule is updated. Based on the determination at 805, the scheduled scan will likely not result in discovering changed attribute values for one or more particular collection groups since the discovery scan frequency occurs more frequently than the change frequency of at least one of the collection groups. In some embodiments, the determination is further based on the last change or update for the particular collection groups. In order to improve the efficiency of the discovery scan, the collection groups that likely will not change are excluded from the next discovery scan. This allows the discovery scan to continue as scheduled but only for the collection groups with attributes that will likely change.

Figure 9:
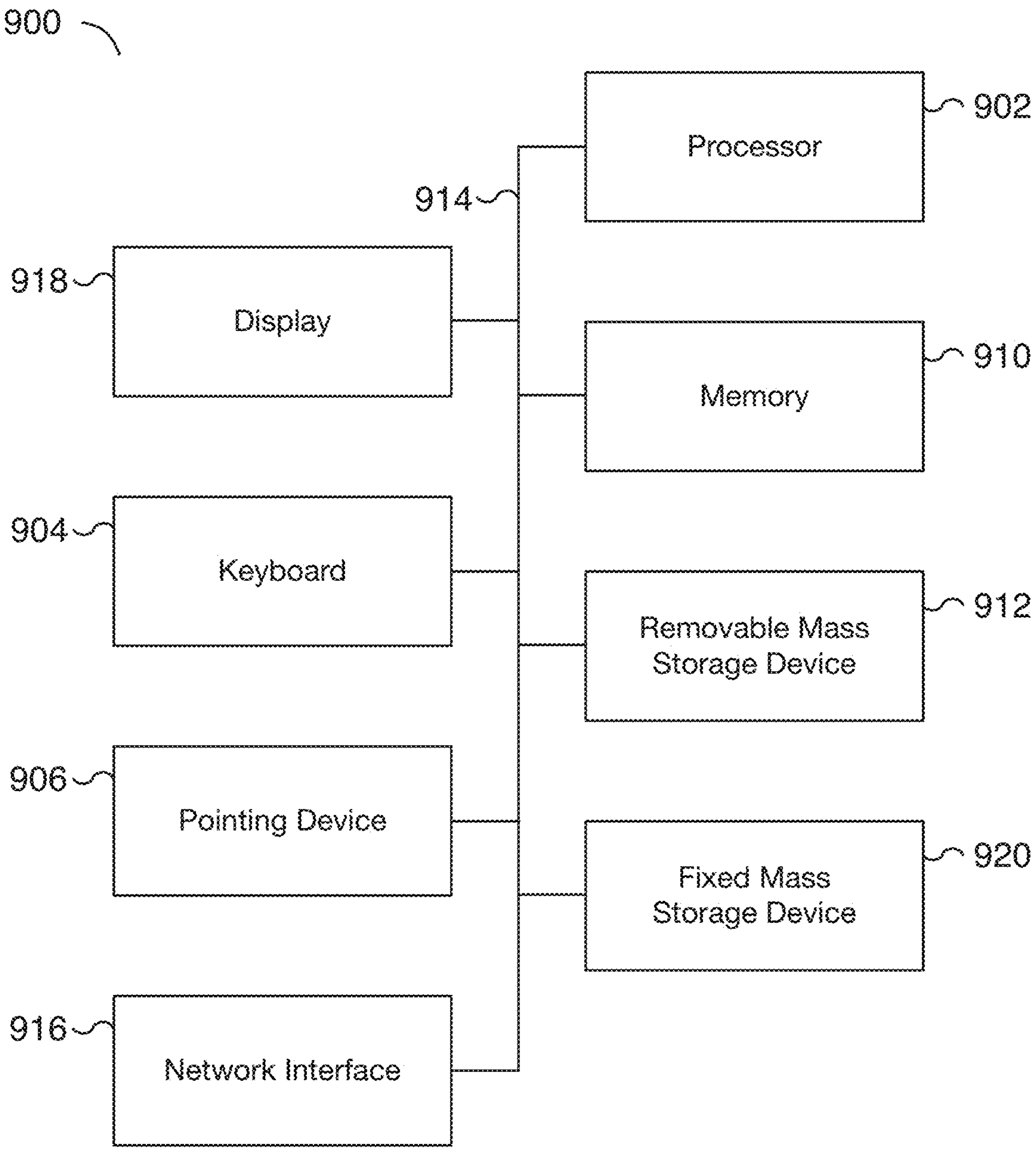
FIG. 9 is a functional diagram illustrating a programmed computer system for performing a discovery scan.

FIG. 9 is a functional diagram illustrating a programmed computer system for performing a discovery scan. As will be apparent, other computer system architectures and configurations can be utilized for order-preserving obfuscation of a protected dataset and/or performing comparison queries on the obfuscated data. Examples of computer system 900 include one or more computers of application server 101 of FIG. 1, one or more computers of database 103 of FIG. 1, internal server 107 of FIG. 1, and devices 113, 115, 117 and 119 of FIG. 1. Computer system 900, which includes various subsystems as described below, includes at least one microprocessor subsystem (also referred to as a processor or a central processing unit (CPU)) 902. For example, processor 902 can be implemented by a single-chip processor or by multiple processors. In some embodiments, processor 902 is a general purpose digital processor that controls the operation of the computer system 900. Using instructions retrieved from memory 910, the processor 902 controls the reception and manipulation of input data, and the output and display of data on output devices (e.g., display 918). In various embodiments, one or more instances of computer system 900 can be used to implement at least portions of the processes of FIGS. 2-8.

Processor 902 is coupled bi-directionally with memory 910, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 902. Also as is well known in the art, primary storage typically includes basic operating instructions, program code, data and objects used by the processor 902 to perform its functions (e.g., programmed instructions). For example, memory 910 can include any suitable computer-readable storage media, described below, depending on whether, for example, data access needs to be bi-directional or unidirectional. For example, processor 902 can also directly and very rapidly retrieve and store frequently needed data in a cache memory (not shown).

A removable mass storage device 912 provides additional data storage capacity for the computer system 900, and is coupled either bi-directionally (read/write) or unidirectionally (read only) to processor 902. For example, storage 912 can also include computer-readable media such as magnetic tape, flash memory, PC-CARDS, portable mass storage devices, holographic storage devices, and other storage devices. A fixed mass storage 920 can also, for example, provide additional data storage capacity. The most common example of mass storage 920 is a hard disk drive. Mass storages 912, 920 generally store additional programming instructions, data, and the like that typically are not in active use by the processor 902. It will be appreciated that the information retained within mass storages 912 and 920 can be incorporated, if needed, in standard fashion as part of memory 910 (e.g., RAM) as virtual memory.

In addition to providing processor 902 access to storage subsystems, bus 914 can also be used to provide access to other subsystems and devices. As shown, these can include a display monitor 918, a network interface 916, a keyboard 904, and a pointing device 906, as well as an auxiliary input/output device interface, a sound card, speakers, and other subsystems as needed. For example, the pointing device 906 can be a mouse, stylus, track ball, or tablet, and is useful for interacting with a graphical user interface.

The network interface 916 allows processor 902 to be coupled to another computer, computer network, or telecommunications network using a network connection as shown. For example, through the network interface 916, the processor 902 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 902 can be used to connect the computer system 900 to an external network and transfer data according to standard protocols. For example, various process embodiments disclosed herein can be executed on processor 902, or can be performed across a network such as the Internet, intranet networks, or local area networks, in conjunction with a remote processor that shares a portion of the processing. Additional mass storage devices (not shown) can also be connected to processor 902 through network interface 916.

An auxiliary I/O device interface (not shown) can be used in conjunction with computer system 900. The auxiliary I/O device interface can include general and customized interfaces that allow the processor 902 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 9 is but an example of a computer system suitable for use with the various embodiments disclosed herein. Other computer systems suitable for such use can include additional or fewer subsystems. In addition, bus 914 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:

obtaining, by an internal server located within a network environment and from a remote application server located outside of the network environment, an identifier associated with a plurality of different collection groups of computer system attributes;

performing, by the internal server, a discovery scan of the plurality of different collection groups at a scan instance;

obtaining, by the internal server, from the remote application server, and for each respective collection group of the plurality of different collection groups, a corresponding first digest value associated with the respective collection group;

determining, by the internal server and for each respective collection group of the plurality of different collection groups, a corresponding second digest value associated with the respective collection group based on attribute values collected for the respective collection group by the internal server during the discovery scan;

based on, for a first collection group of the plurality of different collection groups, the corresponding first digest value being different from the corresponding second digest value, providing, by the internal server and to the remote application server, discovery scan results comprising the attribute values collected for the first collection group; and based on, for a second collection group of the plurality of different collection groups, the corresponding first digest value being equal to the corresponding second digest value, excluding, from the discovery scan results, the attribute values collected for the second collection group.

2. The method of claim 1, wherein the corresponding first digest value of each respective collection group is based on prior attribute values collected for the respective collection group by the internal server during a prior discovery scan.

3. The method of claim 1, wherein the attribute values collected for the first collection group are stored by the remote application server in a configuration management database.

4. The method of claim 1, further comprising:

providing a time value associated with performing the discovery scan of the plurality of different collection groups.

5. The method of claim 1, wherein the remote application server forms part of a cloud service, and wherein the cloud service hosts a discovery service and a configuration management database service.

6. The method of claim 5, wherein the plurality of different collection groups of the computer system attributes is configured using the discovery service.

7. The method of claim 5, wherein the corresponding first digest value of each respective collection group is determined by the discovery service.

8. The method of claim 1, wherein, based on being located within the network environment, the internal server has access privileges to the plurality of different collection groups within the network environment, wherein, based on being located outside of the network environment, the remote application server does not have the access privileges to the plurality of different collection groups within the network environment, and wherein the discovery scan is performed by the internal server using the access privileges.

9. The method of claim 1, wherein the computer system attributes are associated with the plurality of different collection groups based at least in part on recency of changes to the computer system attributes.

10. The method of claim 1, wherein corresponding computer system attributes of at least one collection group of the plurality of different collection groups have been grouped together based on the corresponding computer system attributes being expected to change within a same time period.

11. The method of claim 1, wherein corresponding computer system attributes of at least one collection group of the plurality of different collection groups have been grouped together based on a corresponding frequency with which each respective attribute of the corresponding computer system attributes is expected to change.

12. The method of claim 1, wherein corresponding computer system attributes of at least one collection group of the plurality of different collection groups have been grouped together based on a corresponding change pattern with which each respective attribute of the corresponding computer system attributes has historically changed.

13. The method of claim 1, wherein providing the discovery scan results comprises:

generating batched discovery scan results by aggregating, by the internal server, discovery scan results for the first collection group and at least one other collection group of the plurality of different collection groups; and providing the batched discovery scan results to the remote application server.

14. A system comprising an internal server located within a network environment and having one or more processors configured to:

obtain, from a remote application server located outside of the network environment, an identifier associated with a plurality of different collection groups of computer system attributes;

perform a discovery scan of the plurality of different collection groups at a scan instance;

obtain, from the remote application server and for each respective collection group of the plurality of different collection groups, a corresponding first digest value associated with the respective collection group;

determine, for each respective collection group of the plurality of different collection groups, a corresponding second digest value associated with the respective collection group based on attribute values collected for the respective collection group by the internal server during the discovery scan;

based on, for a first collection group of the plurality of different collection groups, the corresponding first digest value being different from the corresponding second digest value, provide, to the remote application server, discovery scan results comprising the attribute values collected for the first collection group; and based on, for a second collection group of the plurality of different collection groups, the corresponding first digest value being equal to the corresponding second digest value, exclude, from the discovery scan results, the attribute values collected for the second collection group.

15. The system of claim 14, wherein the corresponding first digest value of each respective collection group is based on prior attribute values collected for the respective collection group by the internal server during a prior discovery scan.

16. The system of claim 14, wherein, based on being located within the network environment, the internal server has access privileges to the plurality of different collection groups within the network environment, wherein, based on being located outside of the network environment, the remote application server does not have the access privileges to the plurality of different collection groups within the network environment, and wherein the discovery scan is performed by the internal server using the access privileges.

17. The system of claim 14, wherein corresponding computer system attributes of at least one collection group of the plurality of different collection groups have been grouped together based on the corresponding computer system attributes being expected to change within a same time period.

18. The system of claim 14, wherein corresponding computer system attributes of at least one collection group of the plurality of different collection groups have been grouped together based on a corresponding frequency with which each respective attribute of the corresponding computer system attributes is expected to change.

19. The system of claim 14, wherein corresponding computer system attributes of at least one collection group of the plurality of different collection groups have been grouped together based on a corresponding change pattern with which each respective attribute of the corresponding computer system attributes has historically changed.

20. A computer program product, the computer program product being embodied in a non-transitory computer readable storage medium of an internal server located within a network environment, wherein the computer program product comprises computer instructions for:

obtaining, from a remote application server located outside of the network environment, an identifier associated with a plurality of different collection groups of computer system attributes;

performing a discovery scan of the plurality of different collection groups at a scan instance;

obtaining, from the remote application server and for each respective collection group of the plurality of different collection groups, a corresponding first digest value associated with the respective collection group;

determining, for each respective collection group of the plurality of different collection groups, a corresponding second digest value associated with the respective collection group based on attribute values collected for the respective collection group by the internal server during the discovery scan;

based on, for a first collection group of the plurality of different collection groups, the corresponding first digest value being different from the corresponding second digest value, providing, to the remote application server, discovery scan results comprising the attribute values collected for the first collection group; and based on, for a second collection group of the plurality of different collection groups, the corresponding first digest value being equal to the corresponding second digest value, excluding, from the discovery scan results, the attribute values collected for the second collection group.

* * * * *